Sept. 24, 1974  E. C. EVANS  3,837,991
PLASTIC CUSHIONING REINFORCED MATERIAL
Original Filed May 3, 1971  2 Sheets-Sheet 1

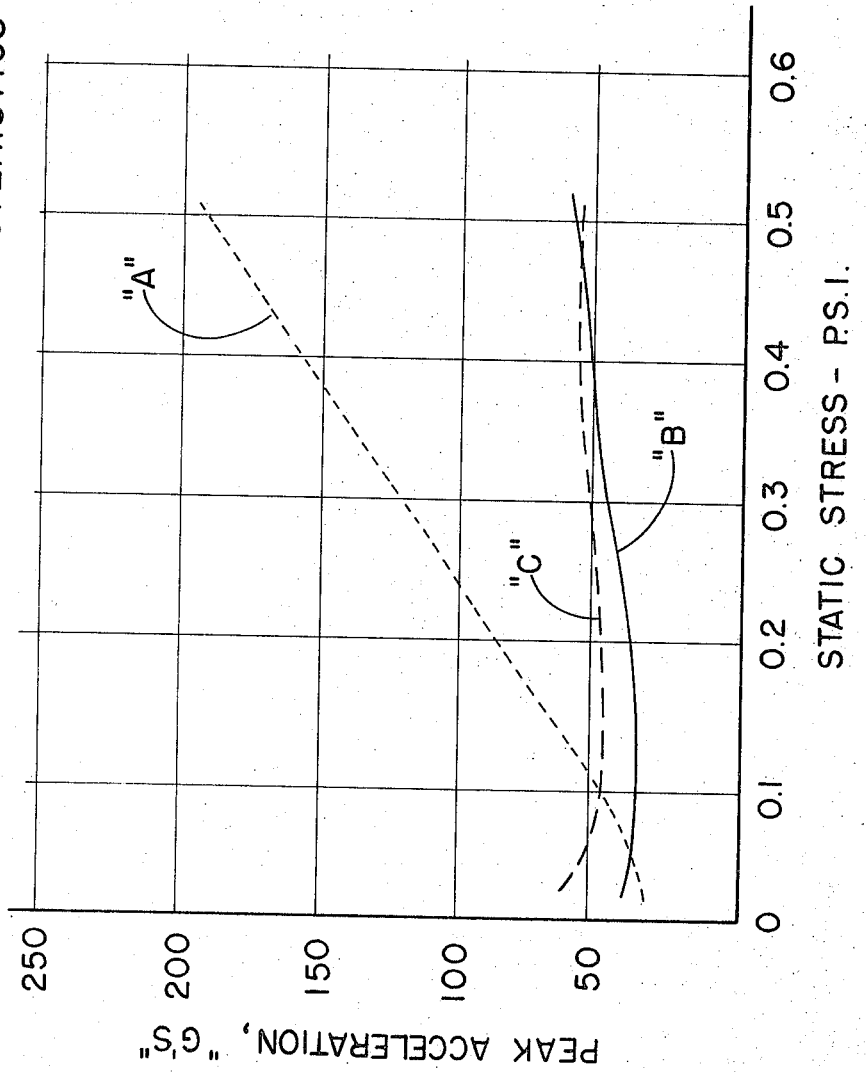

United States Patent Office 3,837,991
Patented Sept. 24, 1974

3,837,991
PLASTIC CUSHIONING REINFORCED MATERIAL
Ernest C. Evans, Appleton, Wis., assignor to Kimberly-Clark Corporation, Neenah, Wis.
Continuation of abandoned application Ser. No. 139,617, May 3, 1971. This application May 10, 1973, Ser. No. 358,904
Int. Cl. B32b 3/12
U.S. Cl. 161—68   4 Claims

ABSTRACT OF THE DISCLOSURE

Multi-ply thermoplastic sheet cushioning material in which a first sheet has a plurality of closely spaced cellular protrusions extending from one side of the sheet and a grid of land areas on the second side of the sheet define openings of the protrusions; a second sheet extends on said grid closing over the protrusions and is secured to land areas of the grid in such manner as to reinforce the first sheet. The second sheet is so secured to the first as to provide for air flow communication between cellular protrusions.

This is a continuation of application Ser. No. 139,617 filed May 3, 1971 now abandoned.

BACKGROUND OF THE INVENTION

Field of the Invention

This invention is concerned with multi-ply thermoplastic sheet cushioning material. More specifically, it is directed to cushioning material having significant resistance to moderate and heavy loadings, particularly under shock impacts.

The Invention With Relation to the Prior Art

It is known to produce thermoplastic sheet cushioning material of both single and multi-ply. The latter mentioned products commonly have at least two sheets in overlying relationship and which retain in hermetically sealed condition a plurality of separate air bubbles; such a structure is dependent for its cushioning qualities on air trapped within the bubbles. A difficulty with the bubble type material is the suceptibility to bubble breakage and loss of cushioning action. Also, such products lack good damping characteristics. Another is the relatively high fabrication cost resulting from the necessity for securing the hermetic sealing. The single ply thermoplastic material is an embossed or molded sheet fabricated into a shape to provide protrusions which are open to the air but effective to deform and cushion against the action of light shock loads on articles supported by the sheet. Such sheets generally do not serve well under moderate or heavy pressures.

I have found that cushion products of the single sheet kind may be materially improved as to ability to accept moderate and heavy loadings while still utilizing relatively light weight thermoplastic films as the sheet material if the sheet is (a) provided with a reinforcement to maintain low distortion under loading, and (b) the reinforcement serves to also provide a non-hermetic air cushion product. I accomplish this by providing on a single or first sheet of a thermoplastic film material having closely spaced cellular protrusions extending from one side of the sheet, a second sheet of much lighter weight and of substantially air impervious character. The first sheet has a grid of interconnecting land areas which define the open ends of its protrusions and the second sheet extends on the grid closing over the protrusions at their open ends. The attachment of this second sheet to the grid is preferably such that some land area surrounding each protrusion opening is united by the second sheet with land areas around the openings of all adjacent protrusions; and the attachment to the land areas is only partial so that no protrusion is completely sealed and air flow communication between adjacent protrusions is achieved. With this arrangement I am able to utilize the cellular protrusion film material under relatively high pressure loadings and while yet maintaining in large measure the flexibility and weight characteristics of the single ply cushion film material.

The second sheet which I employ to overlie the protrusion carrying sheet should be of sufficient firmness that it does not attain a "clinging" character with respect to the first sheet and prevent air movement between cellular protrusions. Also, it should not be so great in thickness that it becomes uneconomical, or excessive in weight or rigidity.

As the protrusion carrying sheet I prefer to employ polyethylene resin of low to medium density, in the range of .915 gms./cc. to .935 gms./cc. Such resins commonly have a melt index of 10 to 20. The second sheet for combination with first sheets of any of the indicated materials may be of low density polyethylene (.917 gms./cc.) and suitably ¾ mil to 1½ mils in thickness. In this range the second sheet conforms well to the land areas of the first and limits adequately the air flow between adjacent protrusions. The specific thickness may be varied somewhat to achieve particular characteristics for special purposes and in view of the particular nature of the film materials employed.

Other film materials useful as the first sheet and as the second sheet include polypropylenes, polystyrenes, polyurethanes, polyvinyls, cellulose derivatives and the like. Preferably, the material for the second sheet is chosen in view of the nature of the material and characteristics of the first sheet, the kind of adhesion to be provided between sheets and the characteristics desired in the composite sheet product.

The invention will be more fully understood by reference to the following detailed description and accompanying drawings wherein:

FIG. 3 is a graph of acceleration vs. applied stress illustrating characteristics of the product in accordance with the invention.

Figure 1:
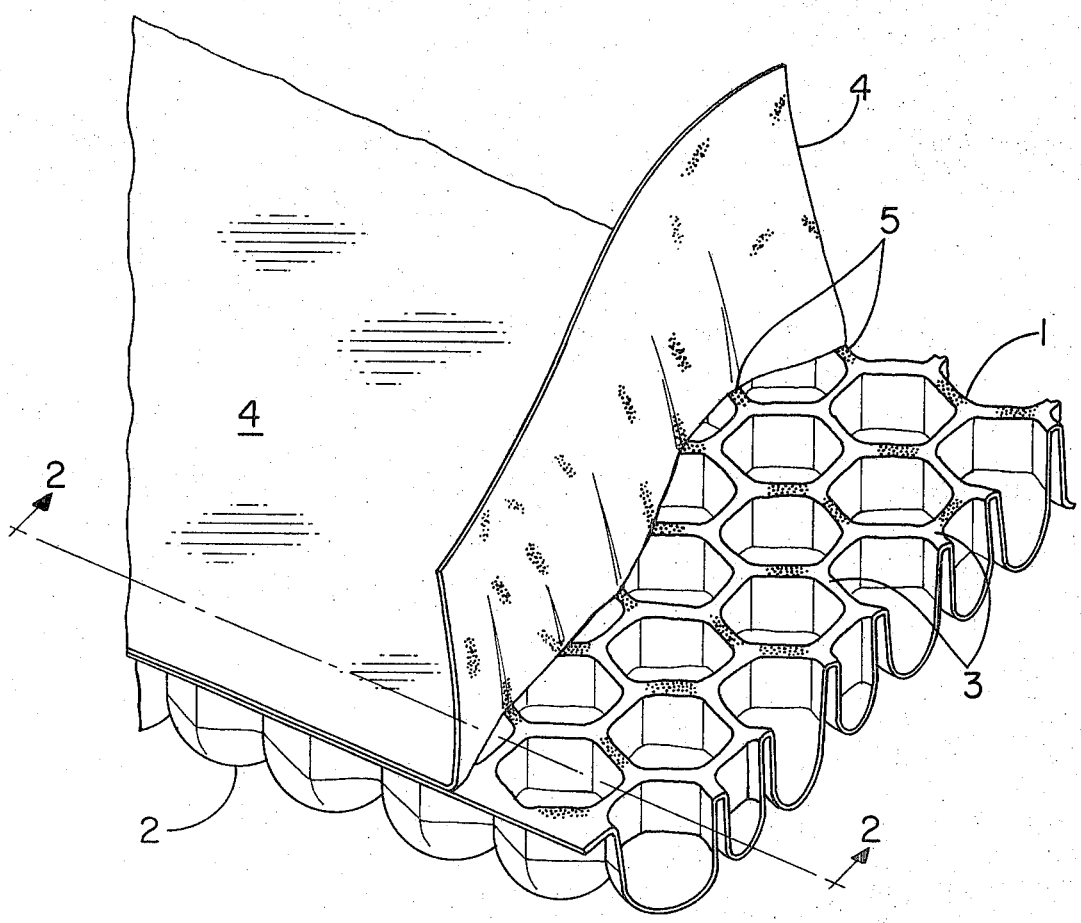
FIG. 1 is a view in perspective of a reinforced product in accordance with the invention with the reinforcing film partially folded back.

Referring to the drawings, the numeral 1 in FIG. 1 designates a formed first sheet of thermoplastic material having a plurality of adjacent closely spaced cellular protrusions indicated at 2 extending from one side of the sheet. The adjacent protrusions are connected by a grid 3 of planar structural elements in the form of land areas which border and define the openings of the protrusions. Secured to the sheet 1 is a second sheet 4 of an air impervious film. This film is suitably approximately of about 1 mil thickness, low density (.917 gms./cc.) polyethylene. It is bonded to the first sheet by heat sealing means indicated at 5. These heat seal bonds may be essentially dots or may extend along the planar portions 1 for significant distances. In any event, more than about 50%, and preferably less than about 75%, of the land areas of the sheet 4 is bonded to the base sheet 1. Thus, a discontinuous bonding arrangement of the upper film to the lower film is provided. Most suitably, for optimum product characteristics, this bonding arrangement is such that a portion of land area around each opening of each protrusion is bonded to land areas surrounding the openings of all adjacent protrusions. This permits the second sheet to serve as a bridge across the openings of the protrusions and to provide a "beam" effect reinforcing the first sheet. Also, some land area around each opening of each protrusion is free of intimate sealing contact with the second sheet. This provides for air flow communication between protrusions particularly when some protrusions are pressed relatively to others.

Figure 2:
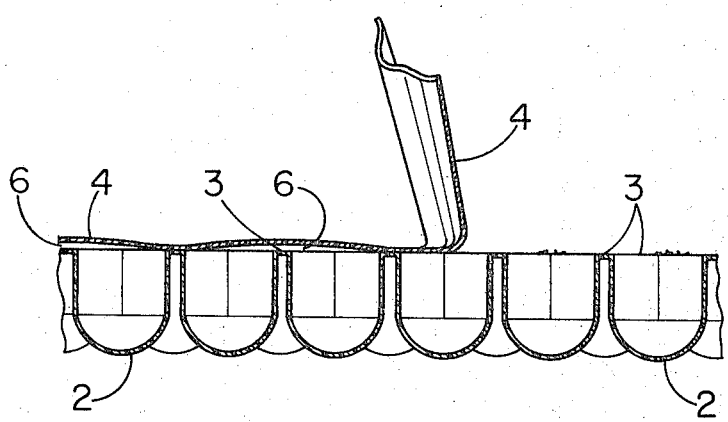
FIG. 2 is a view along line 2—2 of FIG. 1.

Referring particularly to FIG. 2, the illustration of the relationship of the upper sheet 4 to the lower sheet 1 is somewhat exaggerated in the drawings, as indicated at 6, a spacing exists which permits air flow between the upper sheet and the lower base sheet from protrusion to protrusion of the lower base sheet. Also, the spacings such as 6 continue to the edge of the sheet so that air flow may be to the exterior of the sheet from the protrusions and air may also flow to the protrusions from the sheet exterior.

FIG. 3 presents a comparison of several cushioning materials illustrating the utility of the product of this invention. The graphs of FIG. 3 are energy absorption curves. The data for the curves has been obtained in accordance with ASTM-D-1596-64 directed to methods of test for shock absorbing characteristics of package cushioning materials using a 30" drop height. Graph "A" illustrates the cushion characteristics of a single ply product formed of a sheet of low density polyethylene material having closely spaced protrusions, as illustrated at 1 in FIG. 1. Graph "B" illustrates the characteristics of a similar product formed with the same low density polyethylene material but of greater thickness such that the ratio of polyethylene by weight is about 3½ times that of the first mentioned sheet. Graph "C" illustrates the characteristics of a product having a first ply like that of Graph "A" but provided also with the second and overlying sheet of a 1 mil polyethylene as described. As may be clearly seen, the effect of the 1 mil polyethylene ply is to provide the lighter weight protrusion carrying product with a capability of withstanding much greater shock loads without attaining excessive peak acceleration. In fact, the provision of the 1 mil film has imparted to the lower weight protrusion product characteristics very similar to those attained with a single ply product formed from the heavier or much thicker sheet material.

As many apparently widely different embodiments of this invention may be made without departing from the spirit and scope thereof, it is to be understood that I do not limit myself to the specific embodiments thereof except as defined in the appended claims.

I claim:

1. In a flexible, light-weight, non-hermetic package cushioning material comprising a first sheet of a thermoplastic material having closely spaced cellular protrusions extending from one side and a grid of interconnecting land areas on the second side of the sheet material defining open ends of the protrusions, the improvement which comprises a second sheet having a thickness substantially less than said first sheet and such that it does not cling to the first sheet, said second sheet being of a substantially air impervious flexible thermoplastic material extending on said grid closing over the protrusions at their open ends and confining air in the said protrusions, said second sheet securing land areas of the first sheet together to reinforce the first sheet and being free of intimate sealing contact with some portions of land areas around the openings to provide for air flow to the exterior of the cushioning material and air flow communication between adjacent protrusions such that resistance to moderate and heavy pressure and shock loadings of the first sheet is materially increased.

2. A cushioning material according to claim 1 in which a portion of the land area of substantially each opening around a protrusion of the first sheet is bonded to land areas surrounding openings of substantially all adjacent protrusions and some land area around each opening of each protrusion is free of sealing contact with the second sheet.

3. A cushioning material according to claim 1 in which the second sheet has a thickness of between about ¾ and 1½ mils.

4. A cushioning material according to claim 1 in which at least 50%, and not more than about 75%, of the land area of the grid is secured to the second sheet.

References Cited

UNITED STATES PATENTS

| | | | |
|---|---|---|---|
| 2,575,764 | 11/1951 | Morner | 161—127 |
| 2,821,244 | 1/1958 | Beck | 161—127 |
| 3,048,514 | 8/1962 | Bentele et al. | 156—289 |
| 3,231,454 | 1/1966 | Williams | 161—130 |

WILLIAM J. VAN BALEN, Primary Examiner

U.S. Cl. X.R.

156—289; 161—69, 122, 127, 146